(12) United States Patent
Li et al.

(10) Patent No.: US 10,939,459 B2
(45) Date of Patent: Mar. 2, 2021

(54) SCHEDULING-FREE TRANSMISSION METHOD AND APPARATUS

(71) Applicant: DATANG MOBILE COMMUNICATIONS EQUIPMENT CO., LTD, Beijing (CN)

(72) Inventors: Qinghua Li, Beijing (CN); Jian Kong, Beijing (CN); Jinxi Su, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 0 days.

(21) Appl. No.: 16/499,236

(22) PCT Filed: Mar. 9, 2018

(86) PCT No.: PCT/CN2018/078628
§ 371 (c)(1),
(2) Date: Sep. 27, 2019

(87) PCT Pub. No.: WO2018/177115
PCT Pub. Date: Oct. 4, 2018

(65) Prior Publication Data
US 2020/0389910 A1 Dec. 10, 2020

(30) Foreign Application Priority Data
Mar. 29, 2017 (CN) .......................... 201710198395.4

(51) Int. Cl.
*H04W 72/04* (2009.01)
*H04W 72/12* (2009.01)
(Continued)

(52) U.S. Cl.
CPC ....... *H04W 72/1257* (2013.01); *H04W 24/08* (2013.01); *H04W 72/0446* (2013.01);
(Continued)

(58) Field of Classification Search
CPC ......... H04W 72/1257; H04W 72/0446; H04W 72/0453; H04W 72/0486; H04W 72/0493;
(Continued)

(56) References Cited

U.S. PATENT DOCUMENTS

2016/0183305 A1 6/2016 Huang et al.
2020/0092887 A1* 3/2020 Vajapeyam ........... H04L 5/0055

FOREIGN PATENT DOCUMENTS

CN 1398067 A 2/2003
CN 1402946 A 3/2003
(Continued)

OTHER PUBLICATIONS

Institute for Information Industry (III) "Discussion on eMBB and URLLC multiplexing in UL," 3GPP TSG-RAN WG1 NR-Adhoc R1-1700586, Jan. 16-20, 2017, 6 pgs., Spokane, Washington.
(Continued)

*Primary Examiner* — Melvin C Marcelo
(74) *Attorney, Agent, or Firm* — Womble Bond Dickinson (US) LLP

(57) ABSTRACT

Disclosed are a scheduling-free transmission method and apparatus. The method comprises: monitoring a service interaction state to obtain a service requirement evaluation result; determining whether the service requirement evaluation result represents a low service load, and if so, allocating dedicated resources to a terminal, otherwise, allocating shared resources to the terminal; acquiring a transmission result of data transmission carried out by the terminal based on the allocated resources; and based on the transmission result, sending response information to the terminal according to a pre-set dynamic response rule. In this way, a terminal can transmit data by means of dedicated resources when a service load is low, and the terminal transmits data using shared resources when the service load is high, thereby
(Continued)

reducing time delays, preventing resource conflicts, and increasing the transmission rate and reliability.

16 Claims, 4 Drawing Sheets

(51) Int. Cl.
  *H04W 24/08* (2009.01)
  *H04W 72/08* (2009.01)
  *H04W 72/10* (2009.01)

(52) U.S. Cl.
  CPC ... *H04W 72/0453* (2013.01); *H04W 72/0486* (2013.01); *H04W 72/0493* (2013.01); *H04W 72/08* (2013.01); *H04W 72/10* (2013.01); *H04W 72/1252* (2013.01)

(58) Field of Classification Search
  CPC . H04W 72/08; H04W 72/10; H04W 72/1252; H04W 24/08
  See application file for complete search history.

(56) References Cited

FOREIGN PATENT DOCUMENTS

| | | |
|---|---|---|
| CN | 1681348 A | 10/2005 |
| CN | 101171780 A | 4/2008 |
| CN | 102474864 A | 5/2012 |
| EP | 1467498 A1 | 10/2004 |
| WO | 0176304 A1 | 10/2001 |

OTHER PUBLICATIONS

The Korean Office Action for Application No. 10-2019-7031096 dated Nov. 25, 2019, 5 pages.
Nokia, Alcatel-Lucent Shanghai Bell, "Overview of UL data transmission schemes for URLLC," 3GPP TSG-RAN WG1#NR R1-1701025, Jan. 16-20, 2017, 4 pgs., Spokane, Washington.
The International Preliminary Report on Patentability of PCT Application No. PCT/CN2018/078628, dated Oct. 1, 2019, 4 pages.
Catt, et al., "Further details of UL grant-free transmission for URLLC," 3GPP TSG RAN WG1 Meeting #88bis, Apr. 3-7, 2017, 4 pgs., R1-1704585, Spokane, USA.
The Extended European Search Report for European Application No. 18774295 dated Feb. 26, 2020, 10 pages.
Ericsson, "On Low Latency UL Multiple Access in NR," TSG-RAN WG1 #86 BIS, Oct. 10-14, 2016, 4 pgs., R1-1610213, Libson, Portugal.
Ericsson, et. al., "7,1,7," TSG-RAN WG1 #87, Nov. 14-18, 2016, 4 pgs., R1-1612955, Reno, Nevada, USA.
The Japanese Office Action for Japanese Application No. 2019-553336 dated Feb. 19, 2010, 3 pages.
The Official Chinese Office Action for Application No. 201710198395.4 dated Apr. 9, 2019, 5 pages.
Ericsson, "Aspects of grant-free and contention based UL transmission in NR," 3GPP TSG-RAN WG2 #97bis, Apr. 3-7, 2017, 3 pgs., Tdoc R-1702747, Spokane, USA.
Oppo, "Discussion on Mobility Issues of Network Slicing," 3GPP TSG-RAN2#97bis, Apr. 3-7, 2017, 3 pages, R2-1702539, Spokane, USA.
The International Search Report and Written Opinion of the International Searching Authority for PCT Application No. PCT/CN2018/078628 dated May 18, 2018, 14 pages (English Translation).

* cited by examiner

SCHEDULING-FREE TRANSMISSION METHOD AND APPARATUS

CROSS REFERENCE TO RELATED APPLICATIONS

This patent application is a U.S. National Phase Application under 35 U.S.C. § 371 of International Application No. PCT/CN2018/078628, filed on Mar. 9, 2018, entitled SCHEDULING-FREE TRANSMISSION METHOD AND APPARATUS, which claims the benefit and priority of Chinese Patent Application No. CN201710198395.4, filed with the Chinese Patent Office on Mar. 29, 2017, and entitled "A method and apparatus for grant-free transmission," the disclosure of which was incorporated by reference.

FIELD

The present disclosure relates to the field of communications, and particularly to a method and apparatus for grant-free transmission.

BACKGROUND

As the communication technologies are advancing, the $5^{th}$ generation (hereinafter "5G") technologies have emerged. Predominant communication companies have devoted themselves to the research and development of the 5G technologies for the purpose of applying the 5G technologies to ultra-reliable low-latency communication (hereinafter "URLLC") scenarios of the Internet of Things, where the ultra-reliable low-latency communication refers to communication having end-to-end latency at millisecond level and transmission reliability of approximately 100%, able to support numerous application scenarios such as the Internet of Vehicles, intelligent manufacturing, and industrial internet.

Several existing approaches for a base station to allocate resources to a terminal for uplink data transmission are as follows.

In a first approach, the terminal sends control information including an uplink scheduling request (hereinafter "SR") to the base station over a physical uplink control channel (hereinafter "PUCCH"). Then the base station sends an uplink grant (hereinafter "UL grant") to the terminal, and allocates a small amount of resources to the terminal, in response to the received SR. After the terminal sends a buffer status report (hereinafter "BSR") to the base station, the base station allocates a physical uplink shared channel (hereinafter "PUSCH") resource to the terminal according to a sounding reference signal (hereinafter "SRS") obtained from the terminal and available resources of the base station, where uplink time-frequency resources assigned to all terminals are orthogonal to each other so that none of such uplink resources conflict with each other.

As such, each time when a terminal has no PUSCH resource to transmit uplink data, it needs to request PUSCH resources by transmitting an SR. As a result, a data transmission and reception period is 10.5 transmission time intervals (hereinafter "TTIs"), and the value of a TTI is 0.125 ms, that is, a data transmission and reception period is 1.3125 ms, whereas the total latency in the case of retransmission is 17.5 TTIs.

Moreover, successful transmission of uplink data depends on successful reception of the SR, of a physical downlink control channel (hereinafter "PDCCH"), and of the PUSCH. If a block error ratio (hereinafter "BLER") of 10e-5 is required, then the BLERs of each channel are required to be lower than 10e-5, which may be difficult for the SR, the PDCCH, and the PUSCH to satisfy.

As such, a drawback of the first approach lies in that it is difficult to meet the 1 ms latency requirement and the reliability requirement of an air interface for a URLLC service, thus degrading user experience. An advantage thereof lies in that uplink time-frequency resources of all the terminals are orthogonal to each other to avoid conflict of uplink resources.

A second approach is an uplink grant-free transmission approach. By using this approach, the terminal does not need to transmit an SR or to wait for the base station to schedule PUSCH resources when the terminal needs to transmit uplink data. The terminal transmits the data directly upon reception thereof, and the base station needs to pre-configure the terminal with resources or a resource pool for uplink grant-free transmission. The resources used for uplink grant-free transmission by the terminal may be dedicated for the terminal or shared by different terminals.

A complete transmission and reception period for transmitting uplink data by using the second approach is three TTIs, and the total latency in the case of retransmission is 10 TTIs. If an initial BLER is set to 1%, then the average latency equals to 3*99% TTI+10*1% TTI=3.07 TTI, which is shorter than 0.5 ms.

As such, an advantage of the second approach lies in that the average latency is shorter than 0.5 ms, thereby satisfying the short latency required by URLLC, and more retransmission can be supported under the same latency requirement due to shorter latency, thereby improving reliability. A drawback thereof lies in that if an uplink grant-free transmission resource is shared among terminals, and a plurality of terminals transmit uplink data over the same resource, then collisions will occur, and the transmission rate will be lowered.

SUMMARY

Embodiments of the disclosure provide a method and an apparatus for grant-free transmission.

An embodiment of the disclosure provides a method for grant-free transmission. The method includes: monitoring a service interaction state, and obtaining a service demand evaluation result; determining whether the service demand evaluation result indicates a low service load, and when the service demand evaluation result indicates the low service load, then allocating a dedicated resource to a terminal, or when the service demand evaluation result indicates a high service load, then allocating a shared resource to the terminal; obtaining a data transmission result of the terminal over the allocated resource; and transmitting a response to the terminal based upon the data transmission result under a preset dynamic response rule.

According to an implementation mode of the embodiment of the disclosure, monitoring the service interaction state, and obtaining the service demand evaluation result includes: monitoring service interaction states between the apparatus and each terminal; obtaining service interaction state information periodically, where the service interaction state information includes at least the amounts of service interaction between the apparatus and each of the terminals, a service types of the terminal, and a priority of the terminal; determining the total amount of service interaction as the sum of the amounts of service interaction between the apparatus and each of the terminals; and when the total amount of service interaction is above a preset interaction threshold, the service type of the terminal is a non-periodic service, and the priority of the terminal is below a preset priority threshold, then obtaining the service demand evaluation result indicating the high service load; otherwise obtaining the service demand evaluation result indicating the low service load.

According to an implementation mode of the embodiment of the disclosure, determining whether the service demand evaluation result indicates the low service load, and when the service demand evaluation result indicates the low service load, then allocating the dedicated resource to the terminal, or when the service demand evaluation result indicates the high service load, then allocating the shared resource to the terminal includes: when it is determined that the service demand evaluation result indicates the low service load, then allocating a dedicated time-frequency resource to the terminal; or, when it is determined that the service demand evaluation result indicates the high service load, then determining a signal quality corresponding to the amount of service interaction of the terminal, and determining the shared resource corresponding to the signal quality, where the shared resource is a resource shared by a plurality of terminals.

According to an implementation mode of the embodiment of the disclosure, where transmitting the response to the terminal based upon the data transmission result under the preset dynamic response rule includes: obtaining response configuration information of the terminal; and determining whether the response configuration information indicates a standard response, and when the response configuration information indicates the standard response, transmitting the response directly to the terminal, where the response includes at least the data transmission result and identification information of the terminal; otherwise, transmitting the response to the terminal over a physical downlink control channel, where the response message includes at least the data transmission result, resource reuse information, and the identification information of the terminal.

According to an implementation mode of the embodiment of the disclosure, after the response is transmitted to the terminal, the method further includes: configuring a dedicated retransmission resource by selecting the dedicated retransmission resource randomly upon determining that a retransmission priority in a received retransmission request message of the terminal is above a preset retransmission priority threshold; or, configuring the dedicated retransmission resource according to a preset retransmission resource configuration mode upon determining that the retransmission priority in the received retransmission request message of the terminal is above the preset retransmission priority threshold; or, configuring a standard retransmission resource by selecting the standard retransmission resource randomly upon determining that the retransmission priority in the received retransmission request message of the terminal is below the preset retransmission priority threshold; or, configuring the standard retransmission resource according to a preset retransmission resource configuration mode upon determining that the retransmission priority in the received retransmission request message of the terminal is below the preset retransmission priority threshold.

According to an implementation mode of the embodiment of the disclosure, after the response is transmitted to the terminal, the method further includes: allocating a range of retransmission time lengths to the terminal randomly based upon a retransmission time in a received retransmission request message of the terminal; and, selecting a length of latency randomly in the range of retransmission time lengths, where a time for transmitting data to the terminal is set according to the length of latency.

An embodiment of the disclosure provides an apparatus for grant-free transmission. The apparatus includes a transmitter, a processor and a memory storing instructions, where the processor is configured to execute the instructions to: monitor a service interaction state, and obtain a service demand evaluation result; determine whether the service demand evaluation result indicates a service load, and when the service demand evaluation result indicates the low service load, allocate a dedicated resource to the terminal, or when the service demand evaluation result indicates a high service load, then allocate a shared resource to the terminal; obtain a data transmission result of the terminal over the allocated resource; and control the transmitter to transmit a response to the terminal based upon the data transmission result under a preset dynamic response rule.

According to an implementation mode of the embodiment of the disclosure, the processor is further configured to execute the instructions to: monitor service interaction stales between the apparatus and each terminal; obtain service interaction state information periodically, where the service interaction state information includes at least the amounts of service interaction between the apparatus and each of the terminals, a service type of the terminal, and a priority of the terminal; determine the total amount of service interaction as the sum of the amounts of service interaction between the apparatus and each of the terminals; and when the total amount of service interaction is above a preset interaction threshold, the service type of the terminal is a non-periodic service, and the priority of the terminal is below a preset priority threshold, obtain the service demand evaluation result indicating the high service load; otherwise, obtain the service demand evaluation result indicating the low service load.

According to an implementation mode of the embodiment of the disclosure, the processor is further configured to execute the instructions to: when it is determined that the service demand evaluation result indicates the low service load, allocate a dedicated time-frequency resource to the terminal; or, when it is determined that the service demand evaluation result indicates the high service load, determine a signal quality corresponding to the amount of service interaction of the terminal, and determine the shared resource corresponding to the signal quality, where the shared resource is a resource shared by a plurality of terminals.

According to an implementation mode of the embodiment of the disclosure, the processor is further configured to execute the instructions to: obtain response configuration information of the terminal; and determine whether the response configuration information indicates a standard response, and when the response configuration information indicates the standard response, control the transmitter to transmit the response directly to the terminal, where the response includes at least the data transmission result and identification information of the terminal; otherwise, control the transmitter to transmit the response to the terminal over a physical downlink control channel, where the response includes at least the data transmission result, resource reuse information, and identification information of the terminal.

According to an implementation mode of the embodiment of the disclosure, after the response is transmitted to the terminal, the processor is further configured to execute the instructions to: configure a dedicated retransmission resource by selecting the dedicated retransmission resource randomly upon determining that a retransmission priority in a received retransmission request message of the terminal is above a preset retransmission priority threshold; or, configure the dedicated retransmission resource according to a preset retransmission resource configuration mode upon determining that the retransmission priority in the received retransmission request message of the terminal is above the preset retransmission priority threshold; or, configure a standard retransmission resource by selecting the standard retransmission resource randomly upon determining that the retransmission priority in the received retransmission request message of the terminal is below the preset retransmission priority threshold; or, configure the standard retransmission resource according to a preset retransmission resource configuration mode upon determining that the retransmission priority in the received retransmission request message of the terminal is below the preset retransmission priority threshold.

According to an implementation mode of the embodiment of the disclosure, after the response is transmitted to the terminal, the processor is further configured to execute the instructions to: allocate a range of retransmission time lengths to the terminal randomly based upon a retransmission time in a received retransmission request message of the terminal; and, select a length of latency randomly in the range of retransmission time lengths, where a time for transmitting data to the terminal is set according to the length of latency.

DETAILED DESCRIPTION OF THE EMBODIMENTS

Figure 1:
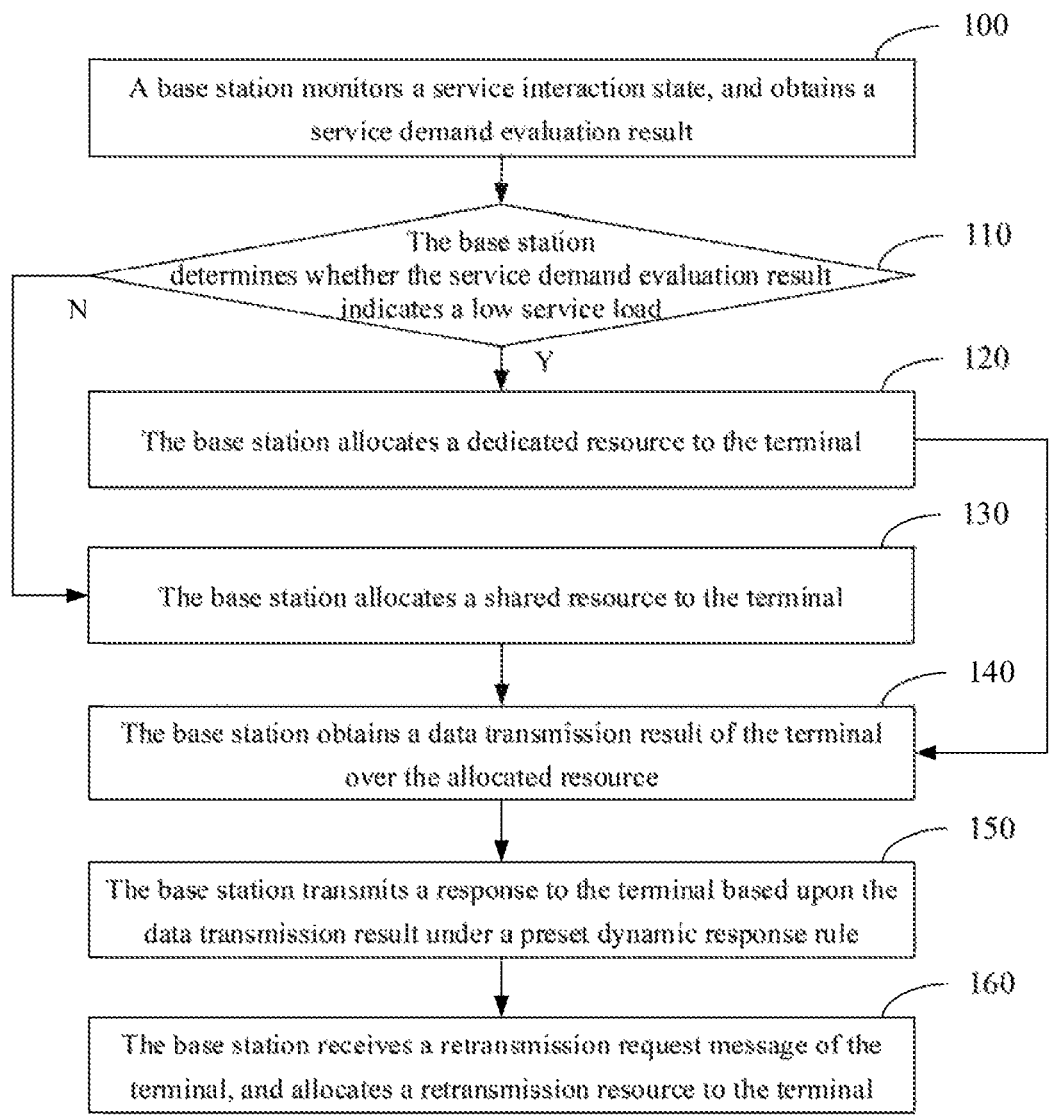
FIG. 1 is a flow chart of a method for grant-free transmission according to an embodiment of the disclosure.

In order to make the objects, technical solutions, and advantages of the embodiments of the disclosure more apparent the technical solutions according to the embodiments of the disclosure will be described below clearly and fully with reference to the accompanying drawings. Apparently the embodiments to be described below are only apart but not all of the embodiments of the disclosure. Based upon the embodiments of the disclosure described herein, all other embodiments which can occur to those ordinarily skilled in the art without making any inventive effort shall fall into the scope of the disclosure.

It shall be appreciated that the technical solutions according to the embodiments of the disclosure can be applicable to various communication systems, e.g., a global system for mobile communications (hereinafter "GSM") system, a code division multiple access (hereinafter "CDMA") system, a wideband code division multiple access (hereinafter "WCDMA") system, a general packet radio service (hereinafter "GPRS") system, a long term evolution (hereinafter "LTE") system, an advanced long term evolution (hereinafter "LTE-A") system, a universal mobile telecommunication system (hereinafter "UMTS"), a new radio (hereinafter "NR") system, and etc.

It shall be further appreciated that according to the embodiments of the disclosure, a terminal includes but is not be limited to a mobile station (hereinafter "MS"), a mobile terminal, a mobile telephone, a handset, portable equipment, and etc. The terminal can communicate with one or more core networks via a radio access network (hereinafter "RAN"). For example, the terminal can be a mobile phone (or a cell phone) or a computer having a function of radio communication, or the user equipment can be a portable, pocket, handheld, built-in-computer, or on-vehicle mobile apparatus.

According to the embodiments of the disclosure, a base station (e.g., an access point) can be an apparatus in an access network that communicates with a radio terminal over one or more sectors via an air interface. The base station can be configured to convert a received air frame into an internet protocol (hereinafter "IP") packet and a received IP packet into an air frame, and operate as a router between the radio terminal and the remaining components of the access network, where the remaining components of the access network can include an IP network. The base station can further coordinate attribute management of the air interface. For example, the base station can be a base transceiver station (hereinafter "BTS") in a GSM or CDMA system, a Node B in a TD-SCDMA or a WCDMA system, an evolved Node B (or referred to as eNodeB, eNB or e-Node B) in an LTE system, or a base station (hereinafter "gNB") in a 5G NR system, although the disclosure is not limited thereto.

The technical solutions according to the embodiments of the disclosure will be described below clearly and fully with reference to the accompanying drawings. Apparently the embodiments to be described below are only a part but not all of the embodiments of the disclosure. Based upon the embodiments of the disclosure described herein, all the other embodiments which can occur to those ordinarily skilled in the art without making any inventive effort shall fall into the scope of the disclosure.

In order to reduce latency, to avoid date collisions, and to improve transmission rates and reliability for data transmission, one of the embodiments of the disclosure provides a method for grant-free transmission, where when a low service load is determined based upon a service interaction state, a dedicated resource is allocated for a terminal, or, when a high service load is determined, a shared resource is allocated for the terminal, and a response is sent to the terminal based upon a result of data transmission over the allocated resource.

Some implementations modes of the embodiment of the disclosure will be described below in details with reference to the drawings.

As illustrated by FIG. 1, a flow of grant-free transmission according to the embodiment of the disclosure is as follows.

At an operation 100, a base station monitors a service interaction state, and obtains a service demand evaluation result.

According to an implementation mode of the embodiment of the disclosure, the base station firstly obtains service interaction state information periodically. The service interaction state information includes at least the amounts of service interaction between the base station and each terminal accessing the base station, a service type of one of the terminals, and a priority of the terminal.

In this way, the base station can monitor and record in real time service interaction states such as the amounts of service interaction between the base station and the terminals accessing the base station.

Then the base station determines the total amount of service interaction as the sum of the amounts of service interaction between the base station and each of the terminals accessing the base station, which are included in the interaction state information.

In this way, the base station can allocate subsequent resources for the one of the terminals according to the current total amount of service interaction.

Furthermore, if the total amount of service interaction is above a preset interaction threshold, the service type of the one of the terminals accessing the base station is a non-periodic service, and the priority of the terminal is below a preset priority threshold, then the base station obtains a service demand evaluation result indicating a high service load. Otherwise, the base station obtains a service demand evaluation result indicating a low service load.

For example, if the base station determines that the service type of the terminal is a periodic URLLC service, then it obtains a service demand evaluation result indicating a low service load.

In another example, if the base station determines that the priority of the terminal is above a preset priority threshold, then it obtains a service demand evaluation result indicating a low service load.

In another example, if the base station determines that the total amount of service interaction is below a preset interaction threshold, then it obtains a service demand evaluation result indicating a low service load.

In another example, if the base station determines that the total amount of service interaction is above the preset interaction threshold, the service type of the terminal is a non-periodic URLLC service, and the priority of the terminal is below the preset priority threshold, then it obtains a service demand evaluation result indicating a high service load.

In this way, the base station can determine the total amount of service interaction, the service types and the priorities of the terminals, according to the service interaction states between the base station and the terminals, and evaluate service load conditions of the terminals to prepare for subsequent resource allocation.

At an operation 110, the base station determines whether the service demand evaluation result indicates a low service load. If so, it proceeds to an operation 120, otherwise it proceeds to the operation 130.

At the operation 120, the base station allocates a dedicated resource to the terminal.

According to an implementation mode of the embodiment of the disclosure, the base station allocates a dedicated resource to the terminal whose service load is indicated to be low by the service demand evaluation result.

Figure 2:
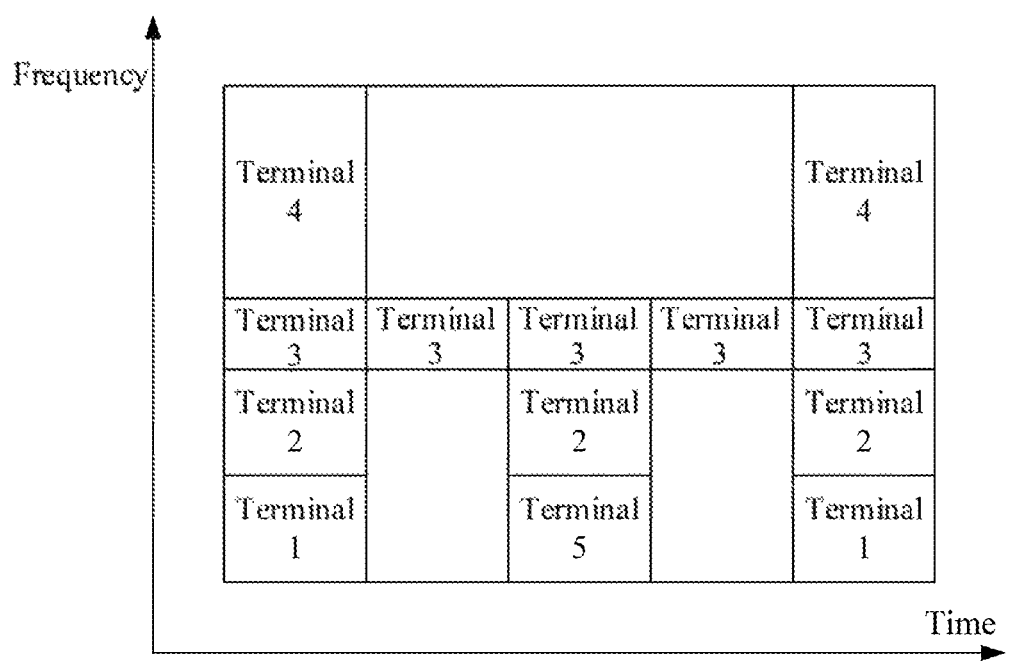
FIG. 2 is a schematic diagram of assignment of dedicated resources according to an implementation mode of the embodiment of the disclosure.

As illustrated in FIG. 2, for example, the base station allocates corresponding dedicated resources to a terminal 1, a terminal 2, a terminal 3, and a terminal 4, respectively. Frequencies corresponding to the dedicated resources allocated to each of the terminals are different, thereby avoiding resource conflicting.

In this way, the base station can allocate a dedicated resource to any terminal having a high priority, and can allocate a dedicated resource to any terminal having a service type of periodic URLLC service. The base station can also allocate dedicated resources to each of the terminals when the total amount of service interaction is low, thereby stopping the resources from conflicting with each other and improving the reliability of data transmission.

At the operation 130, the base station allocates a shared resource to the terminal.

According to an implementation mode of the embodiment the terminal allocates a shared resource to the terminal whose load is indicated to be high according to the service demand evaluation result.

Firstly the base station obtains service information, e.g., frequencies, service rates, and etc., of each terminal already allocated with shared resources, determines service information of the terminal to which the shared resource is to be allocated, and selects an appropriate terminal to share the shared resource with the terminal to which the shared resource is to be allocated.

Figure 3:
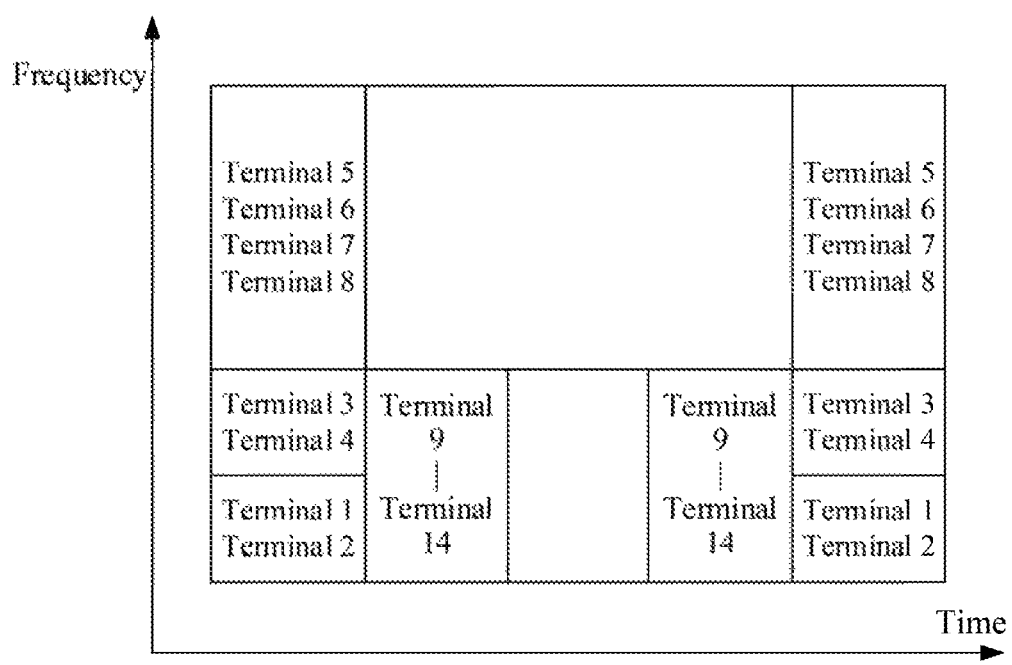
FIG. 3 is a schematic diagram of assignment of shared resources according to an implementation mode of the embodiment of the disclosure.

For example, as illustrated by FIG. 3, if the base station determines that a frequency of a terminal 1 and a frequency of a terminal 2 lie in a same frequency band, then the base station allocates a same shared resource to both the terminal 1 and the terminal 2. If a frequency of a terminal 3 and a frequency of a terminal 4 lie in a same frequency band, then the base station allocates a same shared resource to both the terminal 3 and the terminal 4. If frequencies of each of terminals 5 to 8 lie in a same frequency band, then the base station allocates a same shared resource to the terminals 5 to 8. Due to the large number of terminals, the base station allocates the same shared resources which are allocated to terminals 1 to 4 to terminals 9 to 14, but the resources allocated to the terminals 9-14 lie in different slot from the resources allocated to terminals 1-8 in time domain, thus avoiding resource conflicting.

In this way, the appropriate shared resources can be selected according to service information such as the frequencies and the service rates of the terminals, thereby avoiding resource conflicting.

At an operation 140, the base station obtains a data transmission result of the terminal over the allocated resource.

At an operation 150, the base station transmits a response to the terminal based upon the data transmission result under a preset dynamic response rule.

According to an implementation mode of the embodiment of the disclosure, the base station firstly obtains response configuration information of the terminal.

Then the base station determines whether the response configuration information indicates a standard response. If so, the base station sends the response directly to the terminal, and the terminal handles the response according to a default process flow upon reception of the response, where the response includes at least the data transmission result and identification information of the terminal. Otherwise, the base station sends the response to the terminal over a physical downlink control channel, and the terminal obtains the response over the physical downlink control channel in some period of time, and handles the response according to a notification in the response, where the response includes at least the data transmission result, the identification information of the terminal, and resource reuse information.

For example, if the base station determines that the response configuration information of the terminal indicates a standard response, then the terminal sends the response directly to the terminal.

In another example, if the base station determines that the response configuration information of the terminal indicates a nonstandard response, then the terminal sends the response to the terminal over the physical downlink control channel.

In this way, the terminal can determine whether data transmitted between the base station and the terminal is received correctly, according to whether the response is received.

At an operation 160, the base station receives a retransmission request message of the terminal, and allocates a retransmission resource to the terminal.

According to an implementation mode of the embodiment of the disclosure, the terminal firstly sends a retransmission request message to the base station upon determining that no response sent by the base station is received in a specified period of time.

Then the base station can reallocate a retransmission resource to the terminal by using the following several methods without any limitation thereto.

In a first method, the base station configures a dedicated retransmission resource which is selected randomly upon determining that a retransmission priority included in the received retransmission request message of the terminal is above a preset retransmission priority threshold.

In a second method, the base station configures a dedicated retransmission resource according to a preset retransmission resource configuration mode upon determining that the retransmission priority included in the received retransmission request message of the terminal is above the preset retransmission priority threshold.

In a third method, the base station configures a standard retransmission resource which is selected randomly upon determining that the retransmission priority included in the received retransmission request message of the terminal is below the preset retransmission priority threshold.

In a fourth method, the base station configures a standard retransmission resource according to a preset retransmission resource configuration mode upon determining that the retransmission priority in the received retransmission request message of the terminal is below the preset retransmission priority threshold, based upon the retransmission priority.

In this way, the base station can configure a dedicated retransmission resource to a terminal having a high retransmission priority, and a standard retransmission resource to a terminal having a low retransmission priority, thereby improving a success rate of data transmission by the terminal having the high retransmission priority. Moreover, the base station can also configure the resource by selecting the resource randomly or according to the preset retransmission resource configuration mode, thereby lowering the probability that the resources may conflict with each other, so as to further improve the reliability of data transmission.

Furthermore, the base station allocates a range of retransmission time lengths to the terminal randomly based upon a retransmission time in the received retransmission request message of the terminal, and selects a length of latency randomly in the range of retransmission time lengths, where a time for retransmitting data to the terminal is set according to the length of latency.

Lastly the terminal transmits the data to the base station according to the selected length of latency over the allocated retransmission resource.

For example, if the retransmission priority of the terminal 1 is above the preset retransmission priority threshold, then the base station allocates a dedicated retransmission resource to the terminal by selecting the dedicated transmission resource randomly. The base station allocates a range of retransmission time lengths between 0.5 ms and 0.7 ms to the terminal, and selects a length of latency of 0.6 ms from the range of retransmission time lengths randomly. Furthermore, the terminal retransmits the data to the base station according to the length of latency which is 0.6 ms over the allocated dedicated retransmission resource.

The embodiment above will be described below in further details in connection with a particular application scenario.

Firstly the base station obtains the amounts of service interaction between the base station and each of the terminals accessing the base station, and the service type and priority of the terminal 1.

Then the base station determines that the total amount of service interaction, which is the sum of the amounts of service interaction of each of the terminals accessing the base station, is above a preset interaction threshold.

Next, the base station determines that the service type of the terminal 1 is a non-periodic URLLC service, and the priority thereof is below a preset priority threshold, and obtains a service demand evaluation result indicating a high service load.

Then the base station determines that the frequency of the terminal 2 corresponding to a shared resource Ma is a, the frequency of the terminal 3 corresponding to the shared resource Ma is b, and the frequency of the terminal 1 is c, where a, b, and c lie in the same frequency band, so the base station 1 allocates the shared resource Ma to the terminal 1.

Next, after the terminal transmits data to the base station over the allocated shared resource Ma, the base station sends a response including a data transmission result and identification information of the terminal directly to the terminal based upon response configuration information of the terminal indicating a standard response.

Furthermore if the terminal does not receive any response in a specified period of time which is 5 s, it sends a retransmission request message to the base station. The base station determines that a retransmission priority in the received retransmission request message is above a preset retransmission priority threshold, configures a dedicated retransmission resource by selecting the dedicated retransmission resource randomly, allocates a range of retransmission time lengths between 0.4 ms and 0.6 ms to the terminal randomly based upon a retransmission time in the retransmission request message, and selects a length of latency of 0.5 ms randomly in the range of retransmission time lengths.

Lastly the terminal retransmits the data to the base station according to the length of latency which is 0.5 ms over the allocated dedicated retransmission resource.

Figure 4:
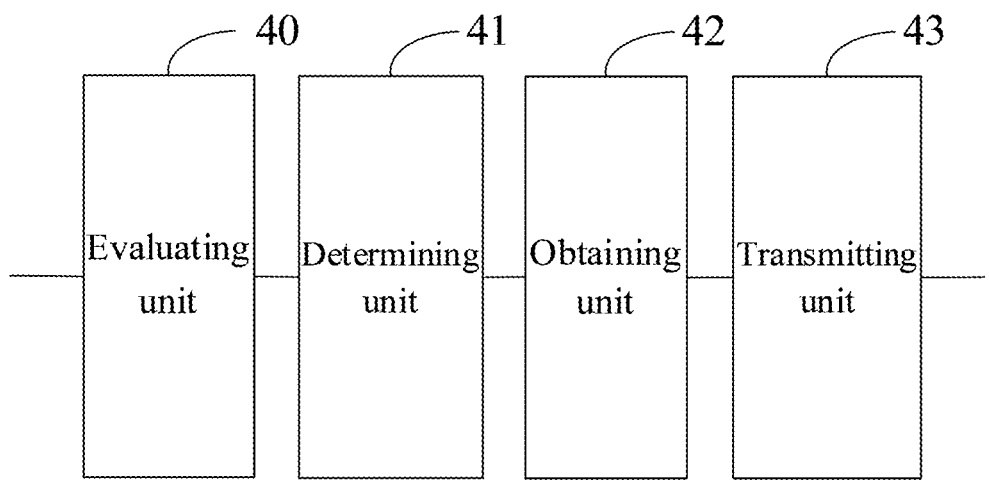
FIG. 4 is a schematic structural diagram of an apparatus for grant-free transmission according to an embodiment of the disclosure.

Further to the embodiment above, FIG. 4 illustrates a schematic structural diagram of an apparatus for grant-free transmission according to another embodiment of the disclosure. The apparatus for grant-free transmission includes an evaluating unit 40, a determining unit 41, an obtaining unit 42 and a transmitting unit 43.

The evaluating unit 40 is configured to monitor a service interaction state, and to obtain a service demand evaluation result.

The determining unit 41 is configured to determine whether the service demand evaluation result indicates a low service load, and if so, to allocate a dedicated resource to the terminal; otherwise, to allocate a shared resource to the terminal.

The obtaining unit 42 is configured to obtain a data transmission result of the terminal over the allocated resource.

The transmitting unit 43 is configured to transmit a response to the terminal based upon the data transmission result under a preset dynamic response rule.

Accordingly to an implementation mode of the embodiment of the disclosure, when the evaluating unit 40 is configured to monitor the service interaction state, and to obtain the service demand evaluation result, the evaluating unit 40 is configured to: monitor service interaction states between the apparatus and each terminal; obtain service interaction state information periodically, where the service interaction state information includes at least the amounts of service interaction between the apparatus and each of the terminals, a service type of the terminal, and a priority of the terminal; determine the total amount of service interaction as the sum of the amounts of service interaction between the apparatus and each of the terminals; and if the total amount of service interaction is above a preset interaction threshold, the service type of the terminal is a non-periodic service, and the priority of the terminal is below a preset priority threshold, obtain the service demand evaluation result indicating a high service load; otherwise, obtain the service demand evaluation result indicating a low service load.

According to an implementation mode of the embodiment of the disclosure, when the determining unit 41 is configured to determine whether the service demand evaluation result indicates a low service load, and if so, to allocate the dedicated resource to the terminal; otherwise, to allocate the shared resource to the terminal, the determining unit 41 is configured to: if it is determined that the service demand evaluation result indicates a low service load, allocate a dedicated time-frequency resource to the terminal; or, if it is determined that the service demand evaluation result indicates a high service load, determine a signal quality corresponding to the amount of service interaction of the terminal, and determine the shared resource corresponding to the signal quality, where the shared resource is a resource shared by a plurality of terminals.

According to an implementation mode of the embodiment of the disclosure, when the transmitting unit 43 is configured to transmit the response to the terminal based upon the transmission result under the preset dynamic response rule, the transmitting unit 43 is configured to: obtain response configuration information of the terminal; and determine whether the response configuration information indicates a standard response, and if so, transmit the response directly to the terminal, where the response includes at least the data transmission result and identification information of the terminal; otherwise, transmit the response to the terminal over a physical downlink control channel, where the response includes at least the transmission result, resource reuse information, and identification information of the terminal.

According to an implementation mode of the embodiment of the disclosure, after the response is transmitted to the terminal, the transmitting unit 43 is further configured to: configure a dedicated retransmission resource by selecting the dedicated retransmission resource randomly upon determining that a retransmission priority in a received retransmission request message of the terminal is above a preset retransmission priority threshold; or, configure the dedicated retransmission resource according to a preset retransmission resource configuration mode upon determining that the retransmission priority in the received retransmission request message of the terminal is above the preset retransmission priority threshold; or, configure a standard retransmission resource by selecting the standard retransmission resource randomly upon determining that the retransmission priority in the received retransmission request message of the terminal is below the preset retransmission priority threshold; or configure the standard retransmission resource according to a preset retransmission resource configuration mode upon determining that the retransmission priority in the received retransmission request message of the terminal is below the preset retransmission priority threshold.

According to an implementation mode of the embodiment of the disclosure, after the response is transmitted to the terminal, the transmitting unit 43 is further configured to: allocate a range of retransmission time lengths to the terminal randomly based upon a retransmission time in a received retransmission request message of the terminal; and select a length of latency randomly in the range of retransmission time lengths, where a time for transmitting data to the terminal is set according to the length of latency.

According to the embodiments of the disclosure, a service interaction state is monitored, and a service demand evaluation result is obtained; it is determined whether the service demand evaluation result indicates a low service load, and if so, then a dedicated resource is allocated to a terminal; otherwise, a shared resource it allocated to the terminal; a data transmission result of the terminal over the allocated resource is obtained; and a response is transmitted to the terminal based upon the data transmission result under a preset dynamic response rule. In this way, the terminal can transmit data over the dedicated resource when the service load is low, and over the shared resource when the service load is high, thereby shortening the latency, avoiding resource conflicting, and improving the transmission rate and the reliability.

Those skilled in the art shall appreciate that the embodiments of the disclosure can be embodied as a method, a system or a computer program product. Therefore, the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the apparatus (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing apparatus to produce a machine so that the instructions executed on the computer or the processor of the other programmable data processing apparatus create means for performing the functions specified in the flow(s) of the flow chart and/or the block(s) of the block diagram.

These computer program instructions can also be stored into a computer readable memory capable of directing the computer or the other programmable data processing apparatus to operate in a specific manner so that the instructions stored in the computer readable memory create an article of manufacture including instruction means which perform the functions specified in the flow(s) of the now chart and/or the block(s) of the block diagram.

These computer program instructions can also be loaded onto the computer or the other programmable data processing apparatus so that a series of operational operations are performed on the computer or the other programmable data processing apparatus to create a computer implemented process so that the instructions executed on the computer or the other programmable apparatus provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents,

What is claimed is:

1. A method for grant-free transmission, comprising:
   monitoring a service interaction state, and obtaining a service demand evaluation result;
   determining whether the service demand evaluation result indicates a low service load, and when the service demand evaluation result indicates the low service load, then allocating a dedicated resource to a terminal, or when the service demand evaluation result indicates a high service load, then allocating a shared resource to the terminal;
   obtaining a data transmission result of the terminal over the allocated resource; and
   transmitting a response to the terminal based upon the data transmission result under a preset dynamic response rule.

2. The method according to claim 1, wherein monitoring the service interaction state, and obtaining the service demand evaluation result comprises:
   monitoring service interaction states between the apparatus and each terminal;
   obtaining service interaction state information periodically, wherein the service interaction state information comprises at least the amounts of service interaction between the apparatus and each of the terminals, a service types of the terminal, and a priority of the terminal;
   determining the total amount of service interaction as the sum of the amounts of service interaction between the apparatus and each of the terminals; and
   when the total amount of service interaction is above a preset interaction threshold, the service type of the terminal is a non-periodic service, and the priority of the terminal is below a preset priority threshold, then obtaining the service demand evaluation result indicating the high service load; otherwise obtaining the service demand evaluation result indicating the low service load.

3. The method according to claim 2, wherein determining whether the service demand evaluation result indicates the low service load, and when the service demand evaluation result indicates the low service load, then allocating the dedicated resource to the terminal, or when the service demand evaluation result indicates the high service load, then allocating the shared resource to the terminal comprises:
   when it is determined that the service demand evaluation result indicates the low service load, then allocating a dedicated time-frequency resource to the terminal; or
   when it is determined that the service demand evaluation result indicates the high service load, then determining a signal quality corresponding to the amount of service interaction of the terminal, and determining the shared resource corresponding to the signal quality, wherein the shared resource is a resource shared by a plurality of terminals.

4. The method according to claim 1, wherein transmitting the response to the terminal based upon the data transmission result under the preset dynamic response rule comprises:
   obtaining response configuration information of the terminal; and
   determining whether the response configuration information indicates a standard response, and when the response configuration information indicates the standard response, transmitting the response directly to the terminal, wherein the response comprises at least the data transmission result and identification information of the terminal; otherwise, transmitting the response to the terminal over a physical downlink control channel, wherein the response message comprises at least the data transmission result, resource reuse information, and the identification information of the terminal.

5. The method according to claim 4, after the response is transmitted to the terminal, further comprising:
   configuring a dedicated retransmission resource by selecting the dedicated retransmission resource randomly upon determining that a retransmission priority in a received retransmission request message of the terminal is above a preset retransmission priority threshold; or
   configuring the dedicated retransmission resource according to a preset retransmission resource configuration mode upon determining that the retransmission priority in the received retransmission request message of the terminal is above the preset retransmission priority threshold; or
   configuring a standard retransmission resource by selecting the standard retransmission resource randomly upon determining that the retransmission priority in the received retransmission request message of the terminal is below the preset retransmission priority threshold; or
   configuring the standard retransmission resource according to a preset retransmission resource configuration mode upon determining that the retransmission priority in the received retransmission request message of the terminal is below the preset retransmission priority threshold.

6. The method according to claim 4, after the response is transmitted to the terminal, further comprising:
   allocating a range of retransmission time lengths to the terminal randomly based upon a retransmission time in a received retransmission request message of the terminal; and
   selecting a length of latency randomly in the range of retransmission time lengths, wherein a time for transmitting data to the terminal is set according to the length of latency.

7. An apparatus for grant-free transmission, comprising:
   an evaluating unit, configured to monitor a service interaction state, and to obtain a service demand evaluation result;
   a determining unit, configured to determine whether the service demand evaluation result indicates a low service load, and when the service demand evaluation result indicates the low service load, to allocate a dedicated resource to the terminal, or when the service demand evaluation result indicates a high service load, then to allocate a shared resource to the terminal;

an obtaining unit, configured to obtain a data transmission result of the terminal over the allocated resource; and a transmitting unit, configured to transmit a response to the terminal based upon the data transmission result under a preset dynamic response rule.

8. The apparatus according to claim 7, wherein when the evaluating unit is configured to monitor the service interaction state, and to obtain the service demand evaluation result, the evaluating unit is configured to:

monitor service interaction states between the apparatus and each terminal;

obtain service interaction state information periodically, wherein the service interaction state information comprises at least the amounts of service interaction between the apparatus and each of the terminals, a service type of the terminal, and a priority of the terminal;

determine the total amount of service interaction as the sum of the amounts of service interaction between the apparatus and each of the terminals; and when the total amount of service interaction is above a preset interaction threshold, the service type of the terminal is a non-periodic service, and the priority of the terminal is below a preset priority threshold, obtain the service demand evaluation result indicating the high service load; otherwise, obtain the service demand evaluation result indicating the low service load.

9. The apparatus according to claim 8, wherein when the determining unit is configured to determine whether the service demand evaluation result indicates the low service load, and when the service demand evaluation result indicates the low service load, to allocate the dedicated resource to the terminal; otherwise, to allocate the shared resource to the terminal, the determining unit is configured to:

when it is determined that the service demand evaluation result indicates the low service load, allocate a dedicated time-frequency resource to the terminal; or when it is determined that the service demand evaluation result indicates the high service load, determine a signal quality corresponding to the amount of service interaction of the terminal, and determine the shared resource corresponding to the signal quality, wherein the shared resource is a resource shared by a plurality of terminals.

10. The apparatus according to claim 7, wherein when the transmitting unit is configured to transmit the response to the terminal based upon the data transmission result under the preset dynamic response rule, the transmitting unit is configured to:

obtain response configuration information of the terminal; and determine whether the response configuration information indicates a standard response, and when the response configuration information indicates the standard response, transmit the response directly to the terminal, wherein the response comprises at least the data transmission result and identification information of the terminal; otherwise, transmit the response to the terminal over a physical downlink control channel, wherein the response comprises at least the data transmission result, resource reuse information, and identification information of the terminal.

11. The apparatus according to claim 10, wherein after the response is transmitted to the terminal, the transmitting unit is further configured to:

configure a dedicated retransmission resource by selecting the dedicated retransmission resource randomly upon determining that a retransmission priority in a received retransmission request message of the terminal is above a preset retransmission priority threshold; or configure the dedicated retransmission resource according to a preset retransmission resource configuration mode upon determining that the retransmission priority in the received retransmission request message of the terminal is above the preset retransmission priority threshold; or configure a standard retransmission resource by selecting the standard retransmission resource randomly upon determining that the retransmission priority in the received retransmission request message of the terminal is below the preset retransmission priority threshold; or configure the standard retransmission resource according to a preset retransmission resource configuration mode upon determining that the retransmission priority in the received retransmission request message of the terminal is below the preset retransmission priority threshold.

12. The apparatus according to claim 10, wherein after the response is transmitted to the terminal, the transmitting unit is further configured:

allocate a range of retransmission time lengths to the terminal randomly based upon a retransmission time in a received retransmission request message of the terminal; and select a length of latency randomly in the range of retransmission time lengths, wherein a time for transmitting data to the terminal is set according to the length of latency.

13. The method according to claim 2, wherein transmitting the response to the terminal based upon the data transmission result under the preset dynamic response rule comprises:

obtaining response configuration information of the terminal; and determining whether the response configuration information indicates a standard response, and when the response configuration information indicates the standard response, transmitting the response directly to the terminal, wherein the response comprises at least the data transmission result and identification information of the terminal; otherwise, transmitting the response to the terminal over a physical downlink control channel, wherein the response message comprises at least the data transmission result, resource reuse information, and the identification information of the terminal.

14. The method according to claim 3, wherein transmitting the response to the terminal based upon the data transmission result under the preset dynamic response rule comprises:

obtaining response configuration information of the terminal; and determining whether the response configuration information indicates a standard response, and when the response configuration information indicates the standard response, transmitting the response directly to the terminal, wherein the response comprises at least the data transmission result and identification information of the terminal; otherwise, transmitting the response to the terminal over a physical downlink control channel, wherein the response message comprises at least the data transmission result, resource reuse information, and the identification information of the terminal.

15. The apparatus according to claim 8, wherein when the transmitting unit is configured to transmit the response to the terminal based upon the data transmission result under the preset dynamic response rule, the transmitting unit is configured to:

obtain response configuration information of the terminal; and determine whether the response configuration information indicates a standard response, and when the response configuration information indicates the standard response, transmit the response directly to the terminal, wherein the response comprises at least the data transmission result and identification information of the terminal; otherwise, transmit the response to the terminal over a physical downlink control channel, wherein the response comprises at least the data transmission result, resource reuse information, and identification information of the terminal.

16. The apparatus according to claim 9, wherein when the transmitting unit is configured to transmit the response to the terminal based upon the data transmission result under the preset dynamic response rule, the transmitting unit is configured to:

obtain response configuration information of the terminal; and determine whether the response configuration information indicates a standard response, and when the response configuration information indicates the standard response, transmit the response directly to the terminal, wherein the response comprises at least the data transmission result and identification information of the terminal; otherwise, transmit the response to the terminal over a physical downlink control channel, wherein the response comprises at least the data transmission result, resource reuse information, and identification information of the terminal.

* * * * *